US012660070B2

(12) United States Patent
De Laat et al.

(10) Patent No.: US 12,660,070 B2
(45) Date of Patent: Jun. 16, 2026

(54) METHOD FOR SELECTING A CONTROL MODE DURING COMMISSIONING OF A LIGHTING CONTROL SYSTEM

(71) Applicant: SIGNIFY HOLDING B.V., Eindhoven (NL)

(72) Inventors: Jules Martinus Adrianus Gerardus De Laat, Boxtel (NL); Meng Zhao, Eindhoven (NL); Mark Henricus Verberkt, Eindhoven (NL); Johannes Antonius Wilhelmus Maria Van Cranenbroek, Budel (NL); Jérôme Eduard Maes, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 44 days.

(21) Appl. No.: 18/864,091

(22) PCT Filed: May 9, 2023

(86) PCT No.: PCT/EP2023/062196
§ 371 (c)(1),
(2) Date: Nov. 8, 2024

(87) PCT Pub. No.: WO2023/217736
PCT Pub. Date: Nov. 16, 2023

(65) Prior Publication Data

US 2025/0338382 A1 Oct. 30, 2025

(30) Foreign Application Priority Data

May 10, 2022 (EP) .................................... 22172477

(51) Int. Cl.
*H05B 47/175* (2020.01)

(52) U.S. Cl.
CPC ....... *H05B 47/1965* (2024.01); *H05B 47/196* (2024.01); *H05B 47/199* (2024.01)

(58) Field of Classification Search
CPC ......................... H05B 47/1965; H05B 47/196; H05B 47/199; G06F 3/013; G06F 3/016
See application file for complete search history.

(56) References Cited

U.S. PATENT DOCUMENTS

| | | | | |
|---|---|---|---|---|
| 9,268,136 | B1 * | 2/2016 | Starner | G06F 3/03547 |
| 10,512,132 | B2 | 12/2019 | Adams et al. | |

(Continued)

FOREIGN PATENT DOCUMENTS

| | | |
|---|---|---|
| JP | 2017142964 A | 8/2017 |
| JP | 2018088119 A | 6/2018 |

*Primary Examiner* — Patrick C Chen

(57) ABSTRACT

A method for selecting a control mode of a user device (4) used in commissioning a lighting control system (2), the method comprising: a) determining (101), by a detector (24), an orientation of the head of a user (3) of the lighting control system commissioning program, b) determining (102), based on the determined orientation of the head, by a processor (26) of the user device (4), whether the user (3) is focusing on a user-interface (28) of the user device (4), c) if it is determined that the user (3) is focusing on the user-interface (28), by the processor (26), automatically switching (103) the lighting control system commissioning program to a first control mode (11) where feedback from and control of the lighting control system commissioning program is at least one of graphical and visual, d) if it is determined that the user (3) does not focus on the user-interface (28), by the processor (26), automatically switching (104) the lighting control system commissioning program to a second control mode (12) where feedback from and control of the lighting control system commissioning program is at least one of audio based and haptic, and e)

(Continued)

while the lighting control system commissioning program is in use, continuously repeating (105) steps a) to d).

15 Claims, 4 Drawing Sheets

(56) References Cited

U.S. PATENT DOCUMENTS

| | | | | |
|---|---|---|---|---|
| 10,512,143 | B1 * | 12/2019 | Ikehara | H05B 47/19 |
| 2015/0130355 | A1 | 5/2015 | Rains, Jr. et al. | |
| 2017/0075421 | A1 * | 3/2017 | Na | G06T 7/74 |
| 2017/0235361 | A1 * | 8/2017 | Rigazio | B60K 35/235 715/710 |
| 2021/0365161 | A1 | 11/2021 | Ellis et al. | |

* cited by examiner

METHOD FOR SELECTING A CONTROL MODE DURING COMMISSIONING OF A LIGHTING CONTROL SYSTEM

CROSS-REFERENCE TO PRIOR APPLICATIONS

This application is the U.S. National Phase application under 35 U.S.C. § 371 of International Application No. PCT/EP2023/062196, filed on May 9, 2023, which claims the benefit of European Patent application Ser. No. 22172477.6, filed on May 10, 2022. These applications are hereby incorporated by reference herein.

FIELD OF THE INVENTION

The invention relates to a method for selecting a control mode of a user device used in commissioning a lighting control system, where the user device is configured to run a lighting control system commissioning program, where the user device comprises a user-interface configured to present the lighting control system commissioning program, and where a user of the lighting control system commissioning program during said commissioning switches between focusing on one or more lighting components of the lighting control system and on the user-interface presenting the lighting control system commissioning program.

BACKGROUND OF THE INVENTION

During commissioning of a lighting control system, the commissioning engineer needs to change his/her focus between the mobile lighting control system commissioning program and the lighting components in the room, for instance to check whether a particular lamp is in an on or an off state. Also, one of the essential steps in the lighting system commissioning process is to locate and map the installed lighting components. Therefore, the engineer has to very frequently switch focus between the commissioning program and the lighting components. Due to the large amount of the devices to be processed, the switching reduces the efficiency of the commissioning process.

U.S. Pat. No. 10,512,143 B1 discloses a lighting control system provided to reduce the time, cost, and potential for error during device commissioning. A controller is programmed to obtain voice commands from a user and to identify and implement device commissioning modes based at least on the obtained voice commands. In a first commissioning mode, the controller configures one or more buttons or equivalent actuators on a control switch mounted in association with a lighting zone. In a second commissioning mode, the controller assigns device grouping and/or configuration data for a plurality of lighting devices (e.g., lighting fixtures, occupancy sensors, light sensors) in operable connection with the control switch. The controller may further in another commissioning mode identify one or more second lighting devices added to or exchanged with one or more of the plurality of first lighting devices and assign device grouping and/or configuration data thereto.

U.S. Pat. No. 10,512,132B discloses a lighting control system for device commissioning with a controller that is programmed to obtain voice commands from a user and to identify and implement device commissioning modes based on the obtained voice commands. In a first commissioning mode, the controller configures one or more buttons or equivalent actuators on a control switch mounted in association with a lighting zone.

There is thus a desire to provide a device and a method of the type mentioned by way of introduction, with which switching is reduced, and the efficiency of the commissioning process is increased.

There is a further desire to provide such a device and method with which the switching focus of the engineer or user may be reduced, and with which it may further be ensured that audio based feedback to the engineer or user, which feedback may otherwise be annoying, is given more sparsely and especially only when strictly necessary.

SUMMARY OF THE INVENTION

It is an object of the present invention to overcome this problem, and to provide a device and a method of the type mentioned by way of introduction, with which switching is reduced, and the efficiency of the commissioning process is increased.

It is a further object of the invention to provide such a device and such a method with which the switching focus of the engineer or user may be reduced, and with which it may further be ensured that audio based feedback to the engineer or user is given more sparsely and especially only when strictly necessary.

According to a first aspect of the invention, this and other objects are achieved by means of a method for selecting a control mode of a user device used in commissioning a lighting control system, where the user device comprises a memory unit configured to store a lighting control system commissioning program, a processor configured to run the lighting control system commissioning program and a user-interface configured to present the lighting control system commissioning program, and where a user of the lighting control system commissioning program during said commissioning switches between focusing on one or more lighting components of the lighting control system and on the user-interface presenting the lighting control system commissioning program, and where the method comprises:

a) determine, by a detector, an orientation of the head of the user of the lighting control system commissioning program,
b) determining, based on the determined orientation of the head, by the processor, whether the user is focusing on the user-interface,
c) if it is determined that the user is focusing on the user-interface, by the processor, automatically switching the lighting control system commissioning program to a first control mode, in which feedback from and control of the lighting control system commissioning program is at least one of graphical and visual,
d) if it is determined that the user does not focus on the user-interface, by the processor, automatically switching the lighting control system commissioning program to a second control mode, in which feedback from and control of the lighting control system commissioning program is at least one of audio based and haptic, and
e) while the lighting control system commissioning program is in use, (continuously) repeating steps a) to d).

Thereby, and in particular in virtue of steps b), c), d) and e) above, a method is provided with which it is ensured that audio based feedback to the engineer or user, which feedback may otherwise be annoying, is given more sparsely and especially only when the user's focus is away from the user device and thus only when strictly necessary.

In particular in virtue of steps c), d) and e) above, this also reduces the switching focus of the engineer or user as it is ensured that the user may be given feedback, and that the user may provide input to the user device, irrespective of whether the user's focus is on the user device or not.

The lighting control system commissioning program is configured for commissioning the lighting control system comprising one or more lighting components.

Thereby, a method of the type mentioned by way of introduction is provided, with which the efficiency of the commissioning process is increased.

In an embodiment, switching the lighting control system commissioning program to the first control mode comprises switching the lighting control system commissioning program to continuously search for or only accept input based on at least one of touch, button click and keyboard typing.

Thereby it is ensured that all relevant input is captured and registered while the first control mode is active. This in turn further reduces the switching focus of the user and ensures that audio-based feedback may be avoided while the first control mode is active. In an embodiment, the first control mode is a graphical interface mode.

Thereby, it is in a particularly simple manner ensured that the user may be given feedback, and that the user may provide input to the user device, when the user's focus is on the user device, which in turn further reduces the switching focus of the user.

In an embodiment, the second control mode is an audio-controlled mode, a speech-controlled mode, a vibration-controlled mode or any combination thereof.

Thereby, it is in a particularly simple manner ensured that the user may be given feedback, and that the user may provide input to the user device, when the user's focus is not on the user device, but for instance on optical components in a room. This in turn further reduces the switching focus of the user and ensures that audio-based feedback may be given only while the second control mode is active. Furthermore, if the commissioning program only reacts to voice commands in the second control mode, this also reduces the chances of unintended voice commands in the first control mode, as in the first control mode, the commissioning program does not react to voice commands.

In an embodiment, switching the lighting control system commissioning program to the second control mode comprises switching the lighting control system commissioning program to continuously search for or only accept input based on at least one of speech and sound received via an acoustic detector.

Thereby it is ensured that all relevant input is captured and registered while the second control mode is active, which in turn further reduces the switching focus of the user.

In an embodiment, determining an orientation of the head of a user of the lighting control system commissioning program comprises using a detection method chosen from the group comprising face recognition, stare detection and eye detection.

These are methods having proven to be particularly precise and efficient for determining orientation of the head of a user of a device.

In an embodiment, switching the lighting control system commissioning program to the first control mode comprises controlling the user interface to show one or more of screen buttons and input fields appropriate for providing input based on at least one of touch, button click and keyboard typing.

In an alternative or additional embodiment, switching the lighting control system commissioning program to the first control mode comprises activating one or more of screen buttons and input fields appropriate for providing input based on at least one of touch, button click and keyboard typing.

Thereby, it is in a particularly simple manner ensured that the user may provide input to the user device when the user's focus is on the user device, which in turn further reduces the switching focus of the user.

In an embodiment, switching the lighting control system commissioning program to the second control mode comprises controlling the lighting control system commissioning program to analyze speech and sounds received via an acoustic detector.

Thereby, it is in a particularly simple manner ensured that the user may provide input to the user device, when the user's focus is not on the user device, but for instance on optical components in a room. This in turn further reduces the switching focus of the user.

In an embodiment, the method further comprises performing at least one of switching the lighting control system commissioning program to the first control mode and switching the lighting control system commissioning program to the second control mode in dependence of one or more activities related to a commissioning step to be performed during commissioning of a lighting control system. The detection of an activity may be done via sensors, like a camera, or via a predefined set of activities.

Thereby it may be ensured that the lighting system commissioning program is switched to a mode for which the one or more activities may be performed or even may be performed in the most efficient manner.

In an embodiment, the method further comprises, for a predetermined sub-group of the one or more activities to be performed during commissioning of a lighting control system, only switching the lighting control system commissioning program to the first control mode.

Thereby, it is ensured that for activities being unsuitable for being performed via voice control, the lighting control system commissioning program is always switched to the first control mode, in which user-interface control is used.

In an embodiment, the lighting control system commissioning program is an app.

The invention also relates to a system for commissioning a lighting control system, the system for commissioning a lighting control system comprising a user-interface, a detector configured to determine an orientation of the head of a user of the lighting control system, a data storage comprising instructions, and a data processing device configured to, when executing the instructions, perform a method according to the invention.

In an embodiment, the detector is configured to perform a detection method chosen from the group comprising face recognition, stare detection and eye detection.

The invention also relates to a system comprising i) a lighting control system comprising one or more lighting components, and ii) a system for commissioning the lighting control system, the system for commissioning a lighting control system comprising a user-interface, a detector configured to determine an orientation of the head of a user of the lighting control system, a data storage comprising instructions, and a data processing device configured to, when executing the instructions, perform a method according to the invention.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
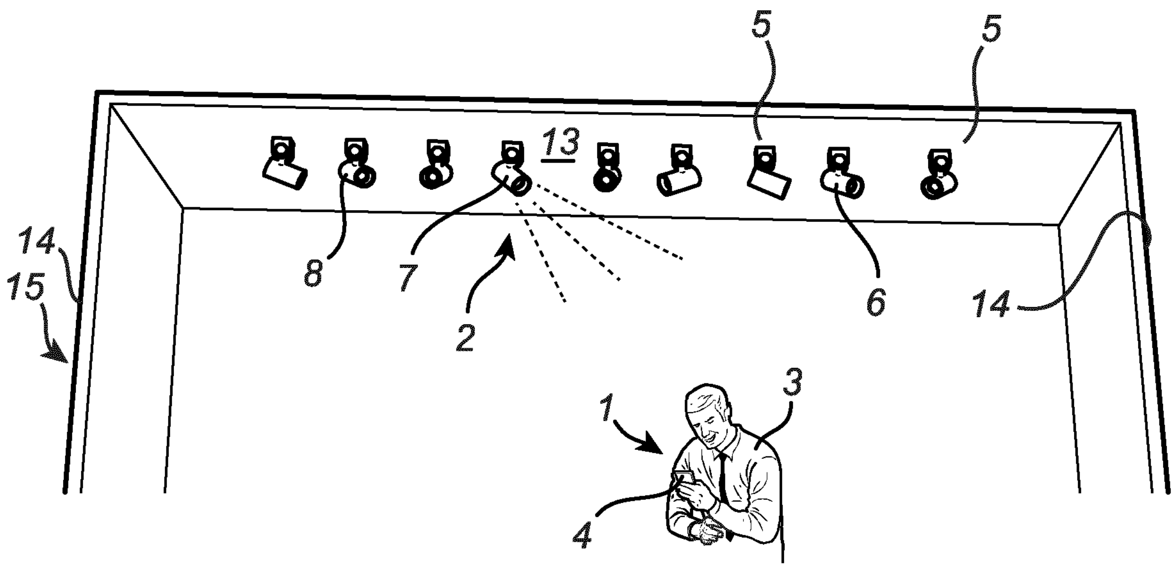
FIG. 1 shows a schematic view of a system according to the invention for commissioning a lighting control system.

FIG. 1 shows a schematic view of a system 1 according to the invention for commissioning a lighting control system 2. The system 1 comprises a user device 4 configured to run a lighting control system commissioning program. An exemplary user device 4 is shown schematically on FIG. 2. The user device 4 is a mobile device. The user device 4 may for instance be a mobile phone, a tablet computer or a laptop computer. The lighting control system commissioning program may be an app 30 (cf. FIGS. 4 and 5-7) configured to run on the user device 4.

Figure 2:
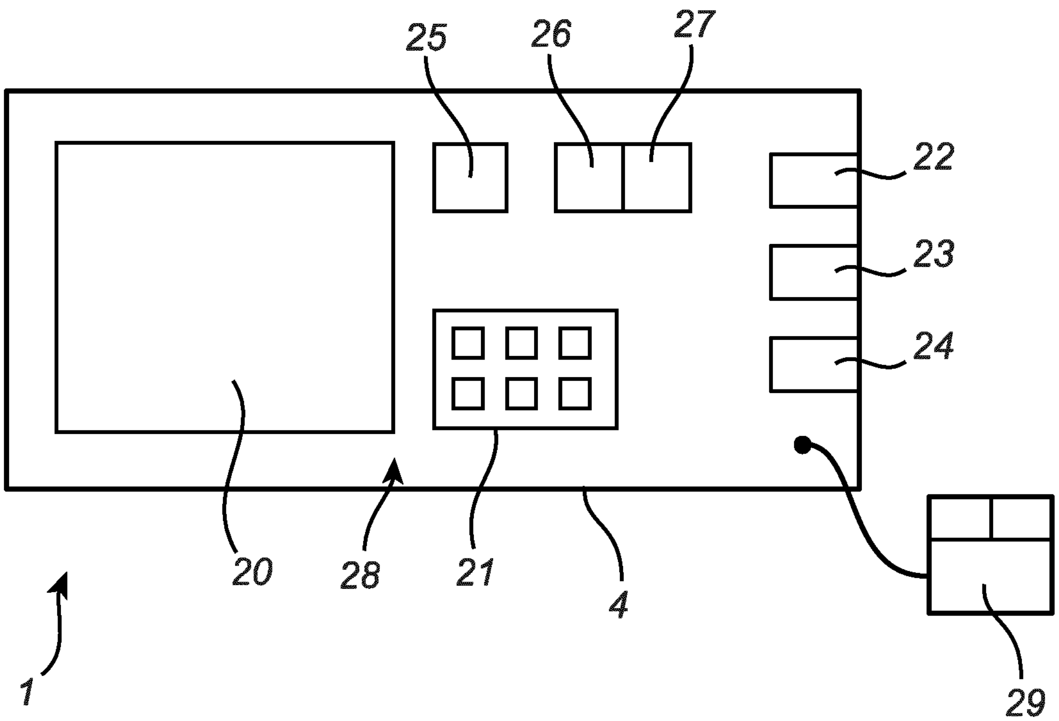
FIG. 2 shows a schematic illustration of a user device of a system according to the invention.

Referring specifically to FIG. 2, the user device 4 comprises a data processing device or processor 26. The processor 26 is configured to run a lighting control system commissioning program. The user device 4 further comprises a data storage or memory 27 on which the lighting control system commissioning program is stored. The memory 27 further comprises instructions for running the lighting control system commissioning program. The processor 26 is configured to execute these instructions.

The user device 4 further comprises a user-interface 28 configured to present the lighting control system commissioning program. The user interface 28 may comprise various input components configured to receive an input from a user 3 and various output components configured to provide an output or a feedback to the user 3. The input components may comprise one or more of a touch screen 20, buttons 21, a mouse 29 or similar device and a microphone 23 for capturing speech and other sounds. The output components may comprise one or more of a display, such as the touch screen 20, a loudspeaker 22 and a haptic unit 25.

The user device 4 further comprises a detector 24. The detector 24 is configured to determine or detect an orientation of the head of a user 3 of the commissioning system 1. The detector 24 may be configured to perform a detection method being one or more of face recognition, stare detection and eye detection. The detector 24 may for instance be a camera. Additionally, the detector 24 may be configured to determine or detect the eye focus, the focus or the viewing direction of the user 3.

Figure 4:
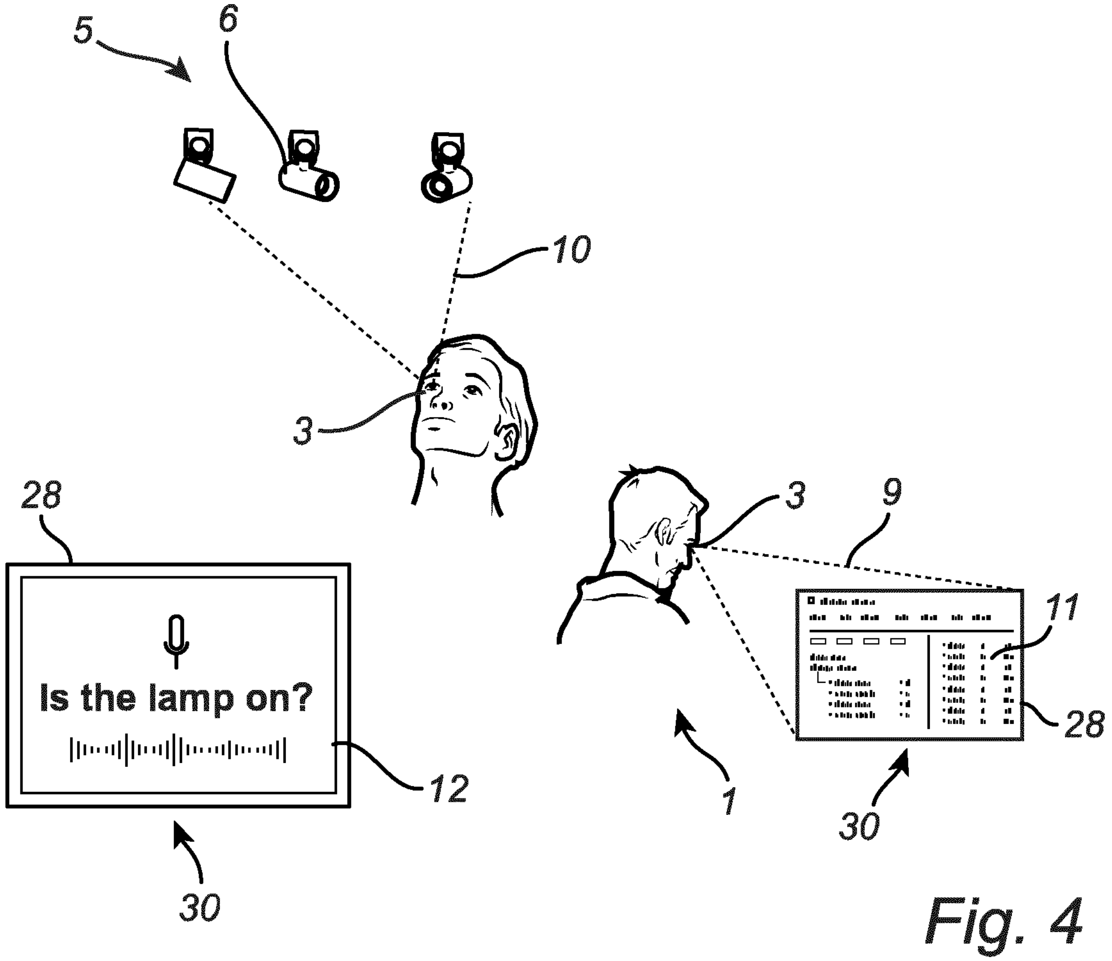
FIG. 4 shows a schematic illustration of the user interaction with a system according to the invention graphically illustrating a first and a second control mode of a user device of a system according to the invention.

As is illustrated on FIG. 4, during commissioning of a lighting control system 2, the user 3 or commissioning engineer switches between focusing on one or more lighting components 6, 7, 8 of the lighting control system 2 and on the user-interface 28 (FIG. 2) of the user device 4 presenting the lighting control system commissioning program. The user 3 will in other words change orientation of the head 9, 10 between the user device 4 with the lighting control system commissioning program (orientation of the head 9) and the array 5 of lighting components 6, 7, 8 of the lighting control system 2 to be commissioned (orientation of the head 10). The lighting control system commissioning program generally serves to aid the user 3 in, for instance, checking whether a particular lighting components 6, 7, 8 is in an on or an off state, and to locate and map the installed lighting components 6, 7, 8. Typically, the lighting components 6, 7, 8 are lamps or luminaires.

The user device 4 is configured to, by using the data processing device 26 to execute instructions stored in the memory 27, perform a method, which will now be described with reference to FIGS. 3 and 4.

Figure 3:
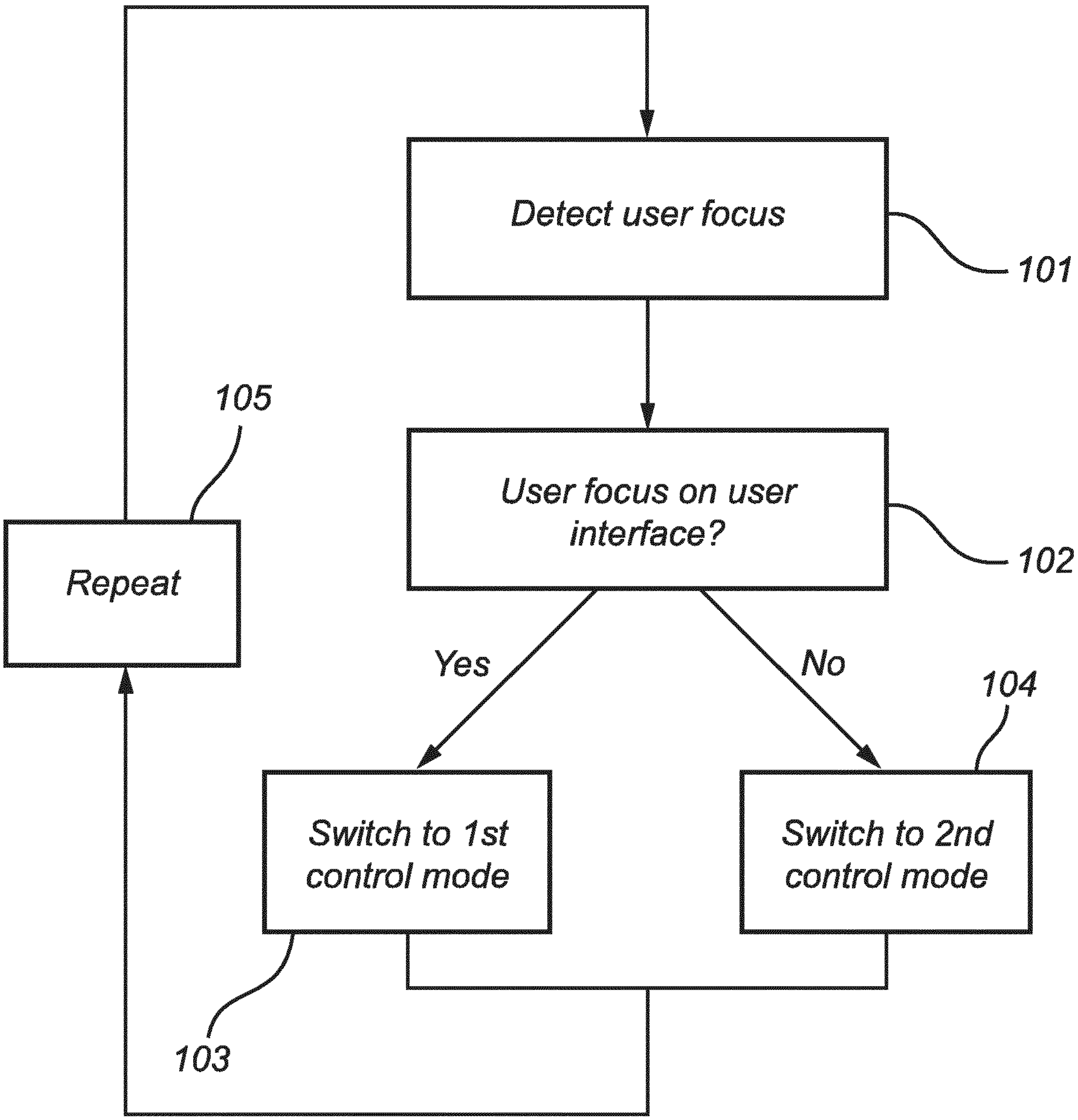
FIG. 3 shows a block diagram illustrating an embodiment of a method according to the invention for selecting a control mode during commissioning of a lighting control system.

Referring first to FIG. 3, the method generally and irrespective of the embodiment comprises the following steps.

First, in step 101, an orientation of the head 9, 10 of a user 3 of the lighting control system commissioning program is determined.

Next, in step 102, it is based on the determined orientation of the head 9, 10 determined whether the user 3 is focusing on the user-interface 28 of the user device 4 or not.

If it is determined that the user's 3 orientation of the head 9 (cf. FIG. 4) is on the user-interface 28, the method continues to step 103, in which the lighting control system commissioning program is automatically switched to a first control mode 11. In the first control mode 11, feedback from the user device 4 and the lighting control system commissioning program is at least one of graphical and visual. Control of the lighting control system commissioning program is likewise at least one of graphical and visual.

If it is determined that the user's 3 orientation of the head 10 (cf. FIG. 4) is not on the user-interface 28, but rather on the lighting components 5, 6, 7, 8, or for that matter elsewhere such as on a ceiling 13 or a wall 14 of a room 15 (FIG. 1), the method continues to step 104. In step 104 the lighting control system commissioning program is automatically switched to a second control mode 12. In the second control mode 12 feedback from the user device 4 and the lighting control system commissioning program is at least one of audio based and haptic. Control of the lighting control system commissioning program is audio based in the second control mode 12.

Finally, while the lighting control system commissioning program is in use, the method includes a step 105 in which steps 101 to 104 are continuously repeated. Thereby it is ensured that the lighting control system commissioning program is always in that of the two control modes 11 and 12 which suits the current conditions best. Thereby the use of audio-based feedback may be reduced.

Step 101 may be performed using the detector 24. Step 101 may be performed using a detection method chosen from the group comprising face recognition, stare detection and eye detection.

Steps 102, 103 and 104 may be done using the processor 26.

Step 103 may comprise switching the lighting control system commissioning program to continuously search for or only accept input based on at least one of touch, button click and keyboard typing. The first control mode 11 may thus be a mode in which the lighting control system commissioning program searches for or only accepts input based on at least one of touch, button click and keyboard typing. The first control mode 11 is a graphical interface mode. Therefore, step 103 may comprise controlling the user interface 28 of the user device 4 to show one or more of screen buttons and input fields appropriate for providing input based on at least one of touch, button click and keyboard typing. Additionally, or alternatively step 103 may comprise activating one or more of screen buttons and input fields appropriate for providing input based on at least one of touch, button click and keyboard typing.

Step 104 may comprise switching the lighting control system commissioning program to continuously search for or only accept input based on at least one of speech and sound received via an acoustic detector. The second control mode 12 may thus be a mode in which to the lighting control system commissioning program searches for or only accepts input based on at least one of speech and sound received via an acoustic detector. The second control mode 12 is an audio-controlled mode, a speech-controlled mode, a vibration-controlled mode or any combination thereof. Therefore, step 104 may comprise controlling the lighting control system commissioning program to analyze speech and sounds received via an acoustic detector, such as the microphone 23. Step 104 may also comprise activating an acoustic detector, such as the microphone 23, to be ready to detect and receive sound.

Table 1 below lists a number of non-limiting commissioning steps which may be carried out via at least one of user-interface control (first control mode 11) or voice control (second control mode 12). A check mark in the column of a control mode denotes that the activity may be carried out in the corresponding control mode.

TABLE 1

| Activity | User-interface | Voice-control |
|---|---|---|
| Create new project in app | ✓ | ✓ |
| Select project from list | ✓ | |
| Scan QR code of gateway | ✓ | |
| Add new room to system | ✓ | ✓ |
| Select room from list | ✓ | |
| Start lamp discovery | ✓ | ✓ |
| Flash the next/previous lamp | ✓ | ✓ |
| Add selected/flashing lamp to room | ✓ | ✓ |
| Add controls to room (like sensor or button panel) using service switch | ✓ | ✓ |
| Add controls to room (like sensor or button panel) using QR code | ✓ | |
| Select control behaviour/template for room | ✓ | ✓ |
| Finish room and start deployment of configuration | ✓ | ✓ |

Example

Figure 5:
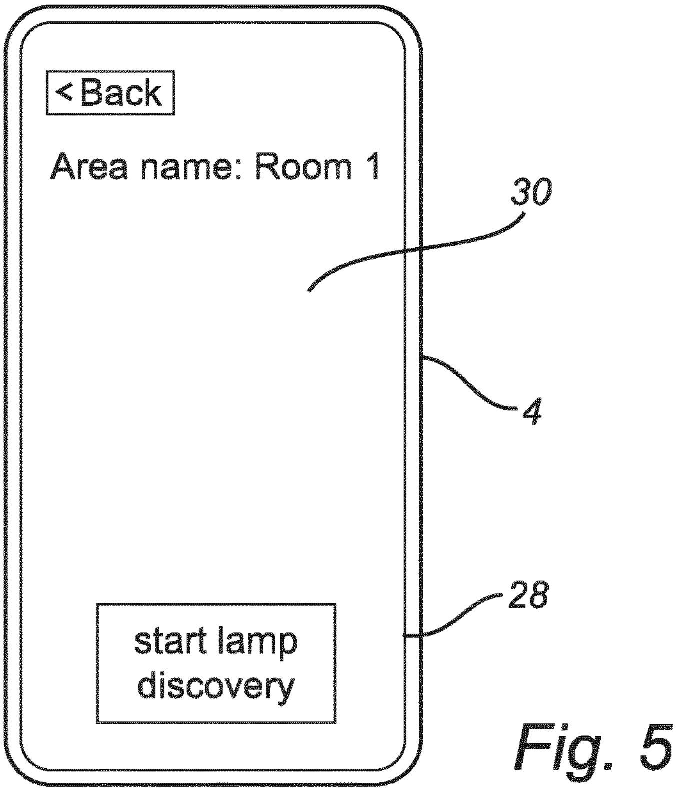
FIGS. 5 to 7 show schematic illustrations of three different exemplary screen images shown by a user-interface of a user device presenting a lighting control system commissioning program of a system according to the invention.
Figure 6:
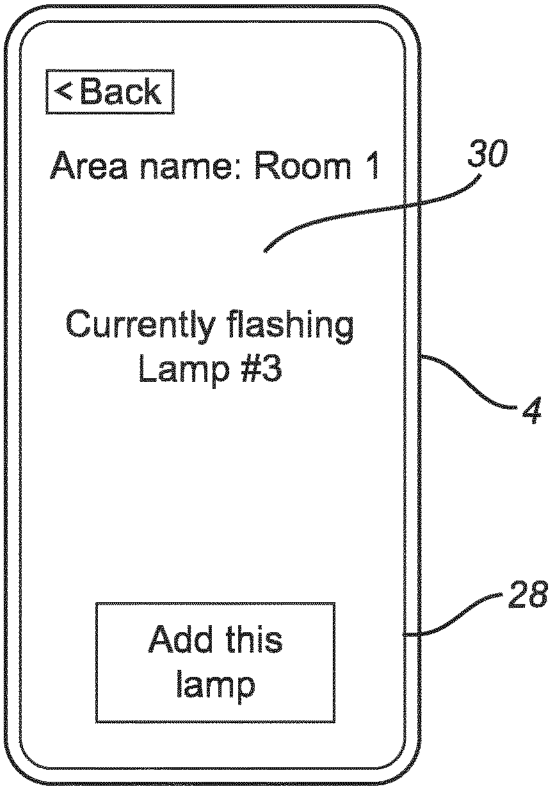
Figure 7:
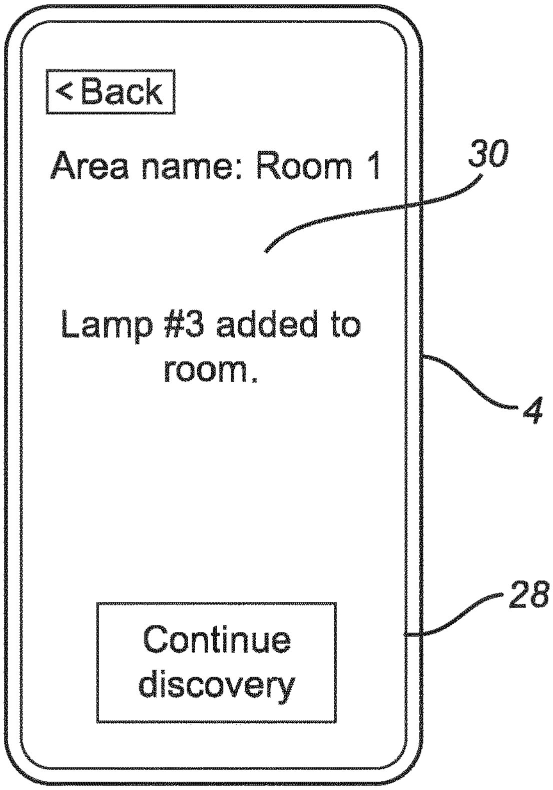

In the following an example will be described referring to FIGS. 5-7. In this example, the task of the user 3 or commissioning engineer is to localize all lamps in a room.

When the user 3 is focused on the user interface 28, the lighting control system commissioning program running on the user device 4 will be in the first control mode 11. Then, the user device 4 will on the user interface 28 show a screen as illustrated in FIG. 5.

If the lighting control system commissioning program and thus the user device 4 now detects that the user 3 has shifted his or her focus away from the user interface 28, the lighting control system commissioning program running on the user device 4 will be shifted to the second control mode 12. The lighting control system commissioning program running on the user device 4 may now use speech to address the user 3. For instance, the lighting control system commissioning program and thus the user device 4 may ask the user 3: "Would you like to start lamp discovery for Room One?" The user 3 may then be provided with a limited amount of time, such as for instance 5 seconds, to reply, typically orally, with either "Yes" or "No".

If the user replies "Yes", the lighting control system commissioning program running on the user device 4 starts the device discovery either via voice (second control mode 12) or via button press (first control mode 11). Then, the user device 4 will on the user interface 28 show a screen as illustrated in FIG. 6. The user device 4 may also cause a lamp or luminaire 6, 7, 8 to flash. With a predetermined time interval, such as for instance two seconds, another lamp may be brought to flash.

During the device discovery process, the orientation of the head 9 or 10 of the user 3 is continuously determined.

If the determination reveals that the user 3 is focused on the user interface 28 or screen, the first control mode 11 is active, no speech is used and the user 3 can provide input by pressing the buttons 21 provided on the user interface 28 or shown on the touch screen 20.

If the determination reveals that the user 3 is not focused on the user interface 28 or screen, the second control mode 12 is active. The lighting control system commissioning program running on the user device 4 may use speech to control the device discovery process, for instance by asking the user 3: "Please say STOP when a lamp in Room One is flashing". Every time another lamp starts to flash, the lighting control system commissioning program will cause the user device 4 to use the haptic unit 25 to shortly beep or vibrate, such that the user 3 knows the next lamp is now flashing. On a predetermined signal from the user 3, such as for instance when the user 3 says "STOP", the flashing lamp is added to the room configuration. The lighting control system commissioning program running on the user device 4 may then use speech to notify the user that the lamp has been added, for instance by telling the user 3: "Lamp #3 is added to Room One, would you like to add more lamps to this room?" This is illustrated by the user interface 28 showing a screen as illustrated in FIG. 7. The user 3 may then again be provided with a limited amount of time, such as for instance 5 seconds, to reply, typically orally, with either "Yes" or "No".

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A method for selecting a control mode of a user device used in commissioning a lighting control system, wherein the user device comprises a memory unit configured to store a lighting control system commissioning program, a processor configured to run the lighting control system commissioning program, and a user-interface configured to present the lighting control system commissioning program, wherein the lighting control system commissioning program is configured for commissioning the lighting control system comprising one or more lighting components, wherein a user of the lighting control system commissioning program during said commissioning switches between focusing on the one or more lighting components of the lighting control system and on the user-interface presenting the lighting control system commissioning program, wherein the method comprises:

a) determining, by a detector, an orientation of the head of the user of the lighting control system commissioning program, b) determining, based on the determined orientation of the head, by the processor, whether the user is focusing on the user-interface, c) if it is determined that the user is focusing on the user-interface, by the processor, automatically switching the lighting control system commissioning program to a first control mode, in which feedback from and control of the lighting control system commissioning program is at least one of graphical and visual, d) if it is determined that the user does not focus on the user-interface, by the processor, automatically switching the lighting control system commissioning program to a second control mode, in which feedback from and control of the lighting control system commissioning program is at least one of audio based and haptic, and e) while the lighting control system commissioning program is in use, repeating steps a) to d).

2. The method according to claim 1, wherein switching the lighting control system commissioning program to the first control mode comprises switching the lighting control system commissioning program to continuously search for or only accept input based on at least one of touch, button click and keyboard typing.

3. The method according to claim 1, wherein the first control mode is a graphical interface mode.

4. The method according to claim 1, wherein the second control mode is an audio-controlled mode, a speech-controlled mode, a vibration-controlled mode or any combination thereof.

5. The method according to claim 1, wherein switching the lighting control system commissioning program to the second control mode comprises switching the lighting control system commissioning program to continuously search for or only accept input based on at least one of speech and sound received via an acoustic detector.

6. The method according to claim 1, wherein determining an orientation of the head of a user of the lighting control system commissioning program comprises using a detection method chosen from the group comprising face recognition, stare detection and eye detection.

7. The method according to claim 1, wherein switching the lighting control system commissioning program to the first control mode comprises one or more of:

controlling the user interface to show one or more of screen buttons and input fields appropriate for providing input based on at least one of touch, button click and keyboard typing, and activating one or more of screen buttons and input fields appropriate for providing input based on at least one of touch, button click and keyboard typing.

8. The method according to claim 1, wherein switching the lighting control system commissioning program to the second control mode comprises controlling the lighting control system commissioning program to analyze speech and sounds received via an acoustic detector.

9. The method according to claim 1, and further comprising performing at least one of switching the lighting control system commissioning program to the first control mode and switching the lighting control system commissioning program to the second control mode in dependence of one or more activities related to a commissioning step to be performed during commissioning of a lighting control system.

10. The method according to claim 9, and further comprising, for a predetermined sub-group of the one or more activities to be performed during commissioning of a lighting control system, only switching the lighting control system commissioning program to the first control mode.

11. The method according to claim 1, wherein the lighting control system commissioning program is an app.

12. A system for commissioning a lighting control system comprising:

a user-interface, a detector configured to determine an orientation of the head of a user of the lighting control system comprising one or more lighting components, a data storage comprising instructions, and a data processing device configured to, when executing said instructions, perform a method according to claim 1.

13. The system according to claim 12, wherein the detector is configured to perform a detection method chosen from the group comprising face recognition, stare detection and eye detection.

14. A system comprising:

a lighting control system comprising one or more lighting components, and a system for commissioning the lighting control system according to claim 12.

15. A system according to claim 14, wherein the one or more lighting components comprises a luminaire.

* * * * *